United States Patent
Dabrowski et al.

(10) Patent No.: US 10,040,048 B1
(45) Date of Patent: Aug. 7, 2018

(54) AUTOMATED MODULAR SYSTEM AND METHOD FOR PRODUCTION OF BIOPOLYMERS

(71) Applicant: SYNTHEGO CORPORATION, Redwood City, CA (US)

(72) Inventors: Paul Dabrowski, Redwood City, CA (US); Michael Dabrowski, Redwood City, CA (US); Fabian Gerlinghaus, Redwood City, CA (US); Alex Pesch, Redwood City, CA (US)

(73) Assignee: SYNTHEGO CORPORATION, Redwood City, CA (US)

( * ) Notice: Subject to any disclaimer, the term of this patent is extended or adjusted under 35 U.S.C. 154(b) by 385 days.

(21) Appl. No.: 14/866,091

(22) Filed: Sep. 25, 2015

Related U.S. Application Data

(60) Provisional application No. 62/055,419, filed on Sep. 25, 2014.

(51) Int. Cl.
*B01J 19/00* (2006.01)
*G05B 19/418* (2006.01)

(52) U.S. Cl.
CPC ...... *B01J 19/0046* (2013.01); *G05B 19/4189* (2013.01); *B01J 2219/00691* (2013.01);
(Continued)

(58) Field of Classification Search
CPC .......... B01J 19/0046; B01J 2219/00691; B01J 2219/00722; B01J 2219/00759; G05B 19/4189; G05B 2219/45092; Y10S 901/02
See application file for complete search history.

(56) References Cited

U.S. PATENT DOCUMENTS

| | | | |
|---|---|---|---|
| 5,368,823 | A | 11/1994 | Mcgraw |
| 5,472,672 | A | 12/1995 | Brennan |

(Continued)

FOREIGN PATENT DOCUMENTS

WO 2014131833 A1 9/2014

OTHER PUBLICATIONS

Thermo Fisher Scientific Inc., ©2010, Multiplexing Technology Thermo Scientific Transcend LX System, Product Specifications, 2 Pages.

(Continued)

*Primary Examiner* — Allan R Wilson
(74) *Attorney, Agent, or Firm* — Wilson Sonsini Goodrich & Rosati

(57) ABSTRACT

The present invention provides an automated modular system and method for production of biopolymers including DNA and RNA. The system and method automates the complete production process for biopolymers. Modular equipment is provided for performing production steps with the individual modules arrange in a linear array. Each module includes a control system and can be rack mounted. One side of the array of modules provides connections for power, gas, vacuum and reagents and is accessible to technicians. On the other side of the array of modules a robotic transport system is provided for transporting materials between module interfaces. The elimination of the requirement for human intervention at multiple steps in the production process significantly decreases the costs of biopolymer production and reduces unnecessary complexity and sources of quality variation.

20 Claims, 6 Drawing Sheets

(52) U.S. Cl.
CPC ............... *B01J 2219/00722* (2013.01); *B01J 2219/00759* (2013.01); *G05B 2219/45092* (2013.01); *Y10S 901/02* (2013.01)

(56) References Cited

U.S. PATENT DOCUMENTS

| | | | |
|---|---|---|---|
| 5,474,796 A | 12/1995 | Brennan | |
| 5,529,756 A | 6/1996 | Brennan | |
| 5,554,501 A | 9/1996 | Coassin | |
| 5,604,097 A | 2/1997 | Brenner | |
| 5,614,608 A | 3/1997 | Krchnak | |
| 5,643,738 A | 7/1997 | Lanzucchi | |
| 5,681,534 A | 10/1997 | Neves | |
| 5,716,584 A | 2/1998 | Baker | |
| 5,750,341 A | 5/1998 | Macevicz | |
| 5,750,672 A | 5/1998 | Kempe | |
| 5,766,556 A | 6/1998 | Dewitt | |
| 5,770,157 A | 6/1998 | Cargill | |
| 5,814,700 A | 9/1998 | Brennan | |
| 5,846,719 A | 12/1998 | Brenner | |
| 5,865,224 A | 2/1999 | Ally | |
| 5,888,830 A | 3/1999 | Mohan | |
| 5,969,119 A | 10/1999 | Macevicz | |
| 5,981,733 A | 11/1999 | Gamble | |
| 6,001,311 A | 12/1999 | Brennan | |
| 6,013,445 A | 1/2000 | Albrecht | |
| 6,022,963 A | 2/2000 | Mcgall | |
| 6,024,925 A * | 2/2000 | Little | B01J 19/0046 222/394 |
| 6,033,631 A | 3/2000 | Zuckermann | |
| 6,040,193 A | 3/2000 | Winkler | |
| 6,042,789 A | 3/2000 | Antonenko | |
| 6,045,755 A | 4/2000 | Lebl | |
| 6,051,439 A | 4/2000 | Antonenko | |
| 6,054,325 A | 4/2000 | Kedar | |
| 6,080,318 A | 6/2000 | Gumm | |
| 6,083,682 A | 7/2000 | Campbell | |
| 6,117,397 A | 9/2000 | Antonenko | |
| 6,121,054 A | 9/2000 | Lebl | |
| 6,126,904 A | 10/2000 | Zuellig | |
| 6,143,252 A | 11/2000 | Haxo | |
| 6,149,869 A | 11/2000 | Antonenko | |
| 6,168,914 B1 | 1/2001 | Campbell | |
| 6,171,797 B1 | 1/2001 | Perbost | |
| 6,267,930 B1 | 7/2001 | Ruediger | |
| 6,270,730 B1 | 8/2001 | Mcluen | |
| 6,274,091 B1 | 8/2001 | Mohan | |
| 6,306,597 B1 | 10/2001 | Macevicz | |
| 6,329,210 B1 | 12/2001 | Schleifer | |
| 6,346,423 B1 | 2/2002 | Schembri | |
| 6,518,067 B1 | 2/2003 | Frank | |
| 6,532,978 B1 | 3/2003 | Müller-Kuhrt | |
| 6,663,832 B2 | 12/2003 | Lebl | |
| 6,811,755 B2 | 11/2004 | Mcluen | |
| 6,846,454 B2 | 1/2005 | Peck | |
| 6,867,050 B2 | 3/2005 | Peck | |
| 6,887,715 B2 | 5/2005 | Schembri | |
| 6,911,151 B1 | 6/2005 | Müller-Kuhrt | |
| 6,932,943 B1 | 8/2005 | Cracauer | |
| 7,115,400 B1 | 10/2006 | Adessi | |
| 7,150,998 B2 | 12/2006 | Mcluen | |
| 7,192,558 B2 | 3/2007 | Mcluen | |
| 7,249,529 B2 | 7/2007 | Massaro | |
| 7,321,828 B2 | 1/2008 | Cowsert | |
| 7,390,459 B2 | 6/2008 | Lebl | |
| 7,411,061 B2 | 8/2008 | Myerson | |
| 7,413,714 B1 | 8/2008 | Schwalbe | |
| 7,435,390 B2 | 10/2008 | Cracauer | |
| 7,435,392 B2 | 10/2008 | Oberbeck | |
| 7,604,996 B1 | 10/2009 | Stuelpnagel | |
| 7,647,186 B2 | 1/2010 | Fowler | |
| 7,858,364 B2 | 12/2010 | Brennan | |
| 7,914,739 B2 | 3/2011 | Heiner | |
| 8,073,666 B2 | 12/2011 | Fowler | |
| 8,084,245 B2 | 12/2011 | Brennan | |
| RE43,097 E | 1/2012 | Albrecht | |
| 8,147,776 B2 | 4/2012 | Mcluen | |
| 8,158,085 B2 | 4/2012 | Mcluen | |
| 8,198,028 B2 | 6/2012 | Rigatti | |
| 8,211,370 B2 | 7/2012 | Downing | |
| 8,404,196 B2 | 3/2013 | Mcluen | |
| 8,415,138 B2 | 4/2013 | Leproust | |
| 8,450,107 B1 | 5/2013 | Zhang | |
| 8,465,694 B2 | 6/2013 | Lebl | |
| 8,481,309 B2 | 7/2013 | Zhang | |
| 8,507,272 B2 | 8/2013 | Zhang | |
| 8,575,071 B2 | 11/2013 | Lau | |
| 8,614,092 B2 | 12/2013 | Zhang | |
| 8,652,810 B2 | 2/2014 | Adessi | |
| 8,669,053 B2 | 3/2014 | Stuelpnagel | |
| 8,697,359 B1 | 4/2014 | Zhang | |
| 8,731,721 B2 | 5/2014 | Heiner | |
| 8,747,780 B2 | 6/2014 | Mcluen | |
| 8,771,945 B1 | 7/2014 | Zhang | |
| 8,784,745 B2 | 7/2014 | Nelson | |
| 8,795,965 B2 | 8/2014 | Zhang | |
| 8,808,986 B2 | 8/2014 | Jacobson | |
| 8,865,406 B2 | 10/2014 | Zhang | |
| 8,871,445 B2 | 10/2014 | Cong | |
| 8,889,356 B2 | 11/2014 | Zhang | |
| 8,889,418 B2 | 11/2014 | Zhang | |
| 8,895,308 B1 | 11/2014 | Zhang | |
| 8,906,616 B2 | 12/2014 | Zhang | |
| 8,932,814 B2 | 1/2015 | Cong | |
| 8,945,839 B2 | 2/2015 | Zhang | |
| 8,993,233 B2 | 3/2015 | Zhang | |
| 8,999,641 B2 | 4/2015 | Zhang | |
| 9,040,678 B2 | 5/2015 | Steemers | |
| 9,069,358 B2 | 6/2015 | Demmitt | |
| 9,073,033 B2 | 7/2015 | Lebl | |
| 9,079,148 B2 | 7/2015 | Rigatti | |
| 9,115,348 B2 | 8/2015 | Haurwitz | |
| 9,150,896 B2 | 10/2015 | Chen | |
| 9,238,671 B2 | 1/2016 | Goryshin | |
| 9,283,535 B2 | 3/2016 | Butler | |
| 9,297,006 B2 | 3/2016 | Adessi | |
| 9,322,063 B2 | 4/2016 | Zhao | |
| 9,370,551 B2 | 6/2016 | Cong | |
| 9,416,411 B2 | 8/2016 | Stuelpnagel | |
| 9,492,820 B2 | 11/2016 | Reed | |
| 9,506,055 B2 | 11/2016 | Lau | |
| 9,598,453 B2 | 3/2017 | Steemers | |
| 9,677,069 B2 | 6/2017 | Rigatti | |
| 9,745,573 B2 | 8/2017 | Stuelpnagel | |
| 9,765,396 B2 | 9/2017 | Zhao | |
| 9,856,471 B2 | 1/2018 | Jacobson | |
| 2001/0028866 A1 | 10/2001 | Ecker | |
| 2001/0051114 A1 | 12/2001 | Mcluen | |
| 2002/0031833 A1 | 3/2002 | Heyneker | |
| 2002/0044894 A1 | 4/2002 | Lebl | |
| 2002/0123133 A1 | 9/2002 | Mehta | |
| 2002/0142341 A1 * | 10/2002 | Kameyama | B01J 19/0046 435/6.11 |
| 2002/0142454 A1 | 10/2002 | Cracauer | |
| 2002/0176811 A1 | 11/2002 | Peck | |
| 2003/0069411 A1 | 4/2003 | Brennan | |
| 2003/0086829 A1 | 5/2003 | Livesay | |
| 2003/0113237 A1 | 6/2003 | Cracauer | |
| 2003/0182068 A1 | 9/2003 | Battersby | |
| 2003/0223909 A1 | 12/2003 | Oberbeck | |
| 2004/0132040 A1 | 7/2004 | Hamill | |
| 2004/0151628 A1 * | 8/2004 | Honkanen | B01J 19/0046 422/63 |
| 2004/0241998 A1 * | 12/2004 | Hanson | H01L 21/32134 438/689 |
| 2005/0169816 A1 | 8/2005 | Kirshner | |
| 2005/0244885 A1 | 11/2005 | Wolber | |
| 2005/0281719 A1 | 12/2005 | Brennan | |
| 2006/0182609 A1 * | 8/2006 | Guerra | B25J 9/109 414/744.7 |
| 2007/0096674 A1 * | 5/2007 | Hashimoto | B25J 9/1674 318/568.13 |
| 2007/0110638 A1 | 5/2007 | Heiner | |
| 2007/0117178 A1 | 5/2007 | Heiner | |

(56) References Cited

U.S. PATENT DOCUMENTS

| | | |
|---|---|---|
| 2007/0128084 A1 | 6/2007 | Coassin |
| 2007/0276965 A1* | 11/2007 | Johnson ............... G05B 19/042 710/8 |
| 2008/0038724 A9 | 2/2008 | Behlke |
| 2008/0058511 A1 | 3/2008 | Hargreaves |
| 2008/0058512 A1 | 3/2008 | Leproust |
| 2008/0261220 A1 | 10/2008 | Cracauer |
| 2009/0023605 A1 | 1/2009 | Lebl |
| 2009/0041634 A1 | 2/2009 | Cracauer |
| 2009/0054605 A1 | 2/2009 | Brennan |
| 2009/0148353 A1 | 6/2009 | Downing |
| 2010/0248981 A1* | 9/2010 | Shirazi ................... B01L 9/523 506/9 |
| 2010/0273264 A1* | 10/2010 | Stout ..................... A01H 4/001 435/430 |
| 2011/0028340 A1 | 2/2011 | Hamill |
| 2011/0123411 A1 | 5/2011 | Butler |
| 2011/0124529 A1 | 5/2011 | Brennan |
| 2011/0136696 A1 | 6/2011 | Heiner |
| 2011/0143965 A1 | 6/2011 | Lebl et al. |
| 2011/0172127 A1 | 7/2011 | Jacobson |
| 2012/0220497 A1 | 8/2012 | Jacobson |
| 2012/0308346 A1* | 12/2012 | Keigler ............. H01L 21/67028 414/222.09 |
| 2013/0165349 A1 | 6/2013 | Butler |
| 2013/0296192 A1 | 11/2013 | Jacobson |
| 2014/0273233 A1 | 9/2014 | Chen |
| 2014/0274809 A1 | 9/2014 | Harvey |
| 2014/0309119 A1 | 10/2014 | Jacobson |
| 2014/0357530 A1 | 12/2014 | Ihang |
| 2015/0071889 A1 | 3/2015 | Musunuru |
| 2015/0369267 A1 | 12/2015 | Bailey |
| 2016/0256844 A1 | 9/2016 | Butler |

OTHER PUBLICATIONS

Dr. Oligo®, AZCO BioTech, Inc., -96/192 DNA/RNA High throughput Synthesizer, 2014, 24 pages.

Deval A. Lashkari et al., "An automated multiplex oligonucleotide synthesizer: Develpment of high-throughput, low-cost DNA synthesis", Proc. Natl. Acad. Sci. USA, vol. 92, pp. 7912-7915, Aug. 1995, Applied Biological Sciences.

Marco Karsten et al., Dionex Corporation, ©2006, Increasing Throughput in LC and LC-MS with a Parallel HPLC System, PITTCON 2006 Presentation, 5 pages.

General Electric Company ©2006, ÄKTA oligopilot plus, Oligonucleotide synthesis, Data File 18/1144-66 AD, Mar. 2006, 8 pages.

AsahiKASEI Bioprocess, Oligonucleotide Synthesizers, © 2014 Asahi Kasei Bioprocess—All rights reserved, 4 pages.

Beckman Instruments Inc., Oligo Series 1000 DNA Synthesis Systems, BR-8046A, ©1996 Beckman Instruments Inc., 12 Pages.

Ji-Yen Cheng et al., "High throughput parallel synthesis of oligonucleotides with 1536 channel synthesizer", Nucleic Acids Research, 2002, vol. 30 No. 18 e93, © 2002 Oxford University Press, 7 pages.

Applied Biosystems, Applied Biosystems 3400 DNA Synthesizer, © 2007, 4 pages.

STC Analytics, HPLC PAL Systems, Front-End Automation for LC/LC-MS Systems, ©2017, 8 pages.

Teledyne Isco, A Teledyne Technologies Company, CombiFlash® Optix 10 Installation and Operation Guide, copyright © 2000, Teledyne Isco, Inc., Revision F, May 1, 2007, 82 pages.

Michael Jensen et al., "Next generation 1536-well oligonucleotide synthesizer with on-the-fly dispense", Journal of Biotechnology 171 (2014) 76-81.

Richard C King et al., "Description and validation of a staggered parallel high performance liquid chromatography system for good laboratory practice level quantitative analysis by liquid chromatography/tandem mass spectrometry", Rapid Commun. Mass Spectrum. 2002; 16: 43-52, Copyright ©2001 John Wiley & Sons, Ltd.

Sriram Kosuri et al., "Large-scale de novo DNA synthesis: technologies and applications", Nature Methods, vol. 1 No. 5, May 2014, 499-507, © 2014 Nature America, Inc.

Linda E Sindelar et al., "High-throughput DNA synthesis in a multichannel format", Nucleic Acids Research, 1995, vol. 23, No. 6: 982-987, ©1995 Oxford University Press.

J. Karafilidis, "Oligonucleotide Synthesis", ACROS Organics Part of Thermo Fisher Scientific, 2008, 8 pages.

Advanced Analytical®, Oligo PRO™ Automated Purity Analyzers, 2016, 4 pages.

Simon Rayner et al., "MerMade: An Oligodeoxyribonucleotide Synthesizer for High Throughput Oligonucleotide Production in Dual 96-Well Plates" GENOME RESEARCH, 8:741-747 ©1998 by Cold Spring Harbor Laboratory Press ISSN 1054-9803/98, 7 Pages.

Waters the Science of What's Possible™, Alliance HPLC High Through System, © Oct. 2008, 7 pages.

Sepiatec GMBH, Technical Data Sepmatix 8x HPLC, © copyright 2012 Sepiatec GmbH, 4 pages.

* cited by examiner

FIG. 3C
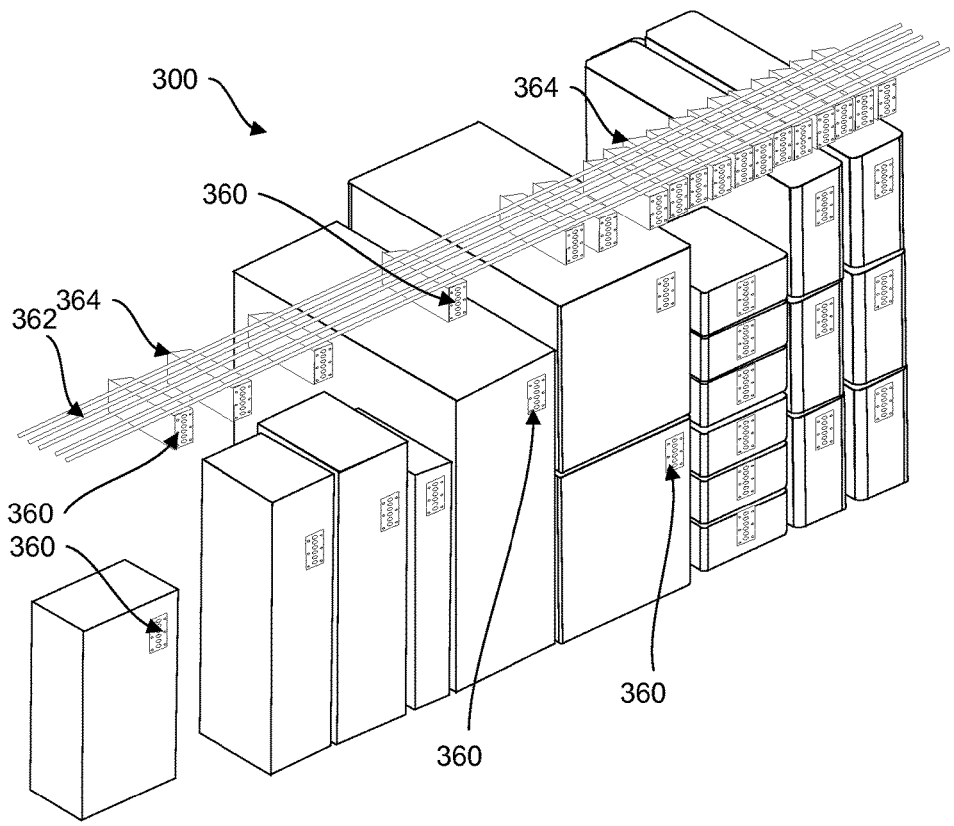
FIG. 3D
FIG. 3E
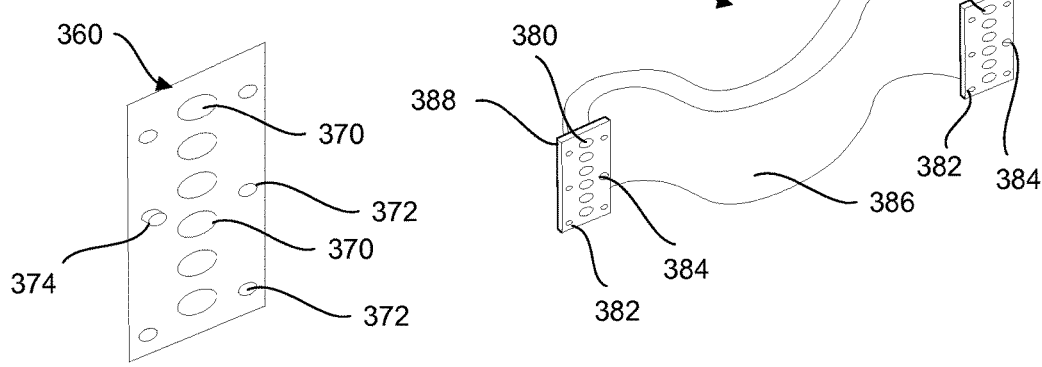

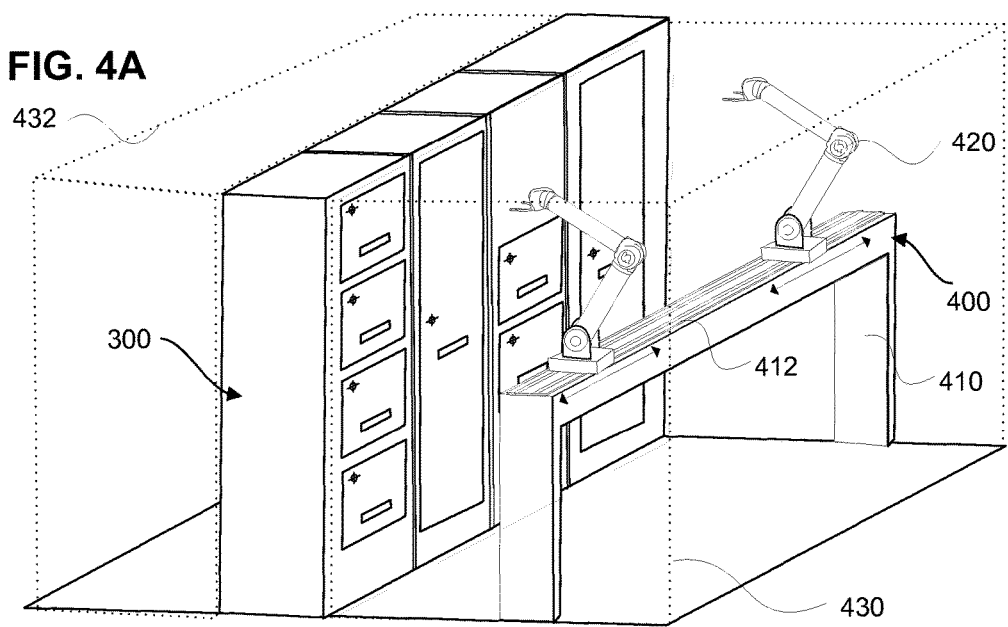
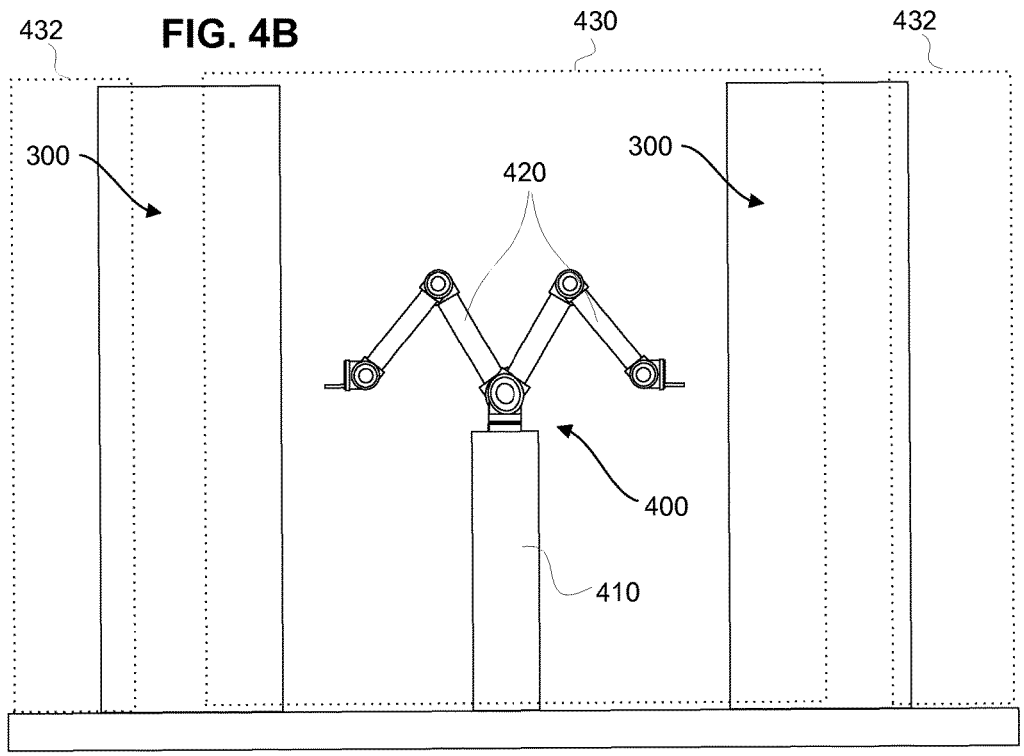

AUTOMATED MODULAR SYSTEM AND METHOD FOR PRODUCTION OF BIOPOLYMERS

CLAIM OF PRIORITY

This application claims priority to U.S. Provisional Patent Application No. 62/055,419, filed Sep. 25, 2014 entitled "AUTOMATED MODULAR SYSTEM AND METHOD FOR PRODUCTION OF BIOPOLYMERS" which application is incorporated herein by reference.

BACKGROUND OF THE INVENTION

Automated systems for the synthesis of DNA or RNA are available. However a complete process for the production of DNA or RNA requires a complex sequence of biochemical processes in addition to the synthesis step. These processes include, for example, preparation of reaction vessels, synthesis of oligonucleotides, cleavage of oligonucleotides from the synthesis support, elution of oligonucleotides, oligonucleotide purification, quantization and quality control of oligonucleotides, re-plating of oligonucleotides, dry down of loaded plates, packaging, and labeling. Although separate equipment is available for performing the individual steps, the full production process is typically labor intensive because it requires skilled technicians to operate the individual pieces of equipment and transport materials between the individual pieces of equipment. The requirement for human intervention at multiple steps in the production process significantly increases the costs of DNA and RNA production and introduces unnecessary complexity and sources of quality variation and error.

SUMMARY OF THE INVENTION

In view of the disadvantages of the state of the art, applicants have developed an automated modular system and method for production of DNA, RNA, modified nucleic acids, aptamers, peptides, and other biological polymers (hereinafter collectively referred to as biopolymers). In an embodiment, the system and method automates the complete production process for DNA and RNA including, for example, preparation of reaction vessels, synthesis of oligonucleotides, cleavage of oligonucleotides from the synthesis support, elution of oligonucleotides, oligonucleotide purification, quantization and quality control of oligonucleotides, re-plating of oligonucleotides, dry down of loaded plates, packaging, and labeling. Modular equipment is provided for performing these steps with the individual modules arranged in an array. Each module includes control systems and can be rack mounted. The rear side of the array of modules provides connections for power, gas, vacuum and reagents and is accessible to technicians. The front side of the array of modules provides mechanical interfaces for access by a robotic transport system which provides for automatic transportation of materials between the modules. The automated production system avoids labor intensive steps requiring skilled technicians to operate the individual pieces of equipment and transport materials between the individual pieces of equipment. The elimination of the requirement for human intervention at multiple steps in the production process significantly decreases the costs of DNA/RNA production and reduces unnecessary complexity and sources of quality variation and error.

The present invention provides an automated production system including a production control system for scheduling and controlling production in an automated production process and a plurality of equipment modules for processing materials under control of the production control system, wherein each equipment module comprises on a front side a mechanical interface for receiving materials and transmitting processed materials, and, on a rear side, an interface for connecting power, network, and any required fluids, and reagents. The plurality of equipment modules is arranged and secured in a linear array such that the mechanical interfaces are accessible from a front side of the linear array and all the interfaces are accessible from a rear side of the linear array. A robotic transport system positioned adjacent the front side of the modular equipment array includes a plurality of robot arms adapted to move materials and processed materials between the mechanical interfaces of the plurality of equipment modules under the control of the production control system whereby the automated production system avoids labor intensive steps requiring skilled technicians to operate the plurality of equipment modules and transport materials between the plurality of equipment modules thereby decreasing the cost of production, and reducing unnecessary complexity and sources of quality variation and error. In various embodiments, the automated production system may be configured to operate a biopolymer production process wherein the production process is one of a DNA synthesis process, an RNA synthesis process, an oligonucleotide synthesis process, an aptamer synthesis process, a peptide synthesis process, and a polymer synthesis process.

In an embodiment, the automated production system also provides for continuous quality control of input reagents and materials and output biopolymer products thereby providing for closed loop software control at the system, instrument and channel levels in which the system, instruments, and/or channels may be tuned or calibrated to enhance performance in response to the collected quality control data relevant to the system, instrument or channels. The quality control data can be continuously analyzed to determine tuning and or calibration that is required and transmit instructions to the instruments of the automated production system 100.

In a particular embodiment, the automated production system is configured for production of oligonucleotides. In the particular embodiment the plurality of equipment modules include an oligonucleotide synthesis module, an oligonucleotide purification module, an oligonucleotide quantization module; an oligonucleotide quality control module, an oligonucleotide re-plating module, a centrifuge module for oligonucleotide dry down and a packaging and labeling module. The automated production system is capable of automatically producing oligonucleotides under control of the production control system and without human intervention during the normal course of operation. Human intervention is only required for maintenance and for replacement of certain consumable parts and reagents.

Thus, the present invention provides an automated modular system and method for production of biopolymers. Although the particular automated production system described in the detailed description below is directed to the production of DNA and RNA, the modular system may be readily adapted by substitution of various components to the production of other biopolymers where it is necessary or desirable to produce a large number of different compounds in an automated and efficient manner or conduct analysis or experimentation in an automated and efficient manner. Other objects, features and advantages of the invention will be apparent from the drawings and detailed description.

BRIEF DESCRIPTION OF THE DRAWINGS

The above and further features, advantages and benefits of the present invention will be apparent upon consideration of the present description taken in conjunction with the accompanying drawings.

FIGS. 3C-3E illustrate a supply system designed to facilitate connection of required utilities according to an embodiment of the present invention.

FIGS. 4A-4C show aspects of a robotic transport system for moving materials between equipment of the modular equipment array of FIGS. 3A and 3B according to an embodiment of the present invention.

DETAILED DESCRIPTION OF THE INVENTION

The following description is of the best modes presently contemplated for practicing various embodiments of the present invention. The description is not to be taken in a limiting sense but is made merely for the purpose of describing the general principles of the invention. The scope of the invention should be ascertained with reference to the claims. In the description of the invention that follows, like numerals or reference designators will be used to refer to like parts or elements throughout. In addition, the first digit of a reference number identifies the set of drawings in which the reference number first appears.

Automated DNA/RNA Production Process

Figure 1:
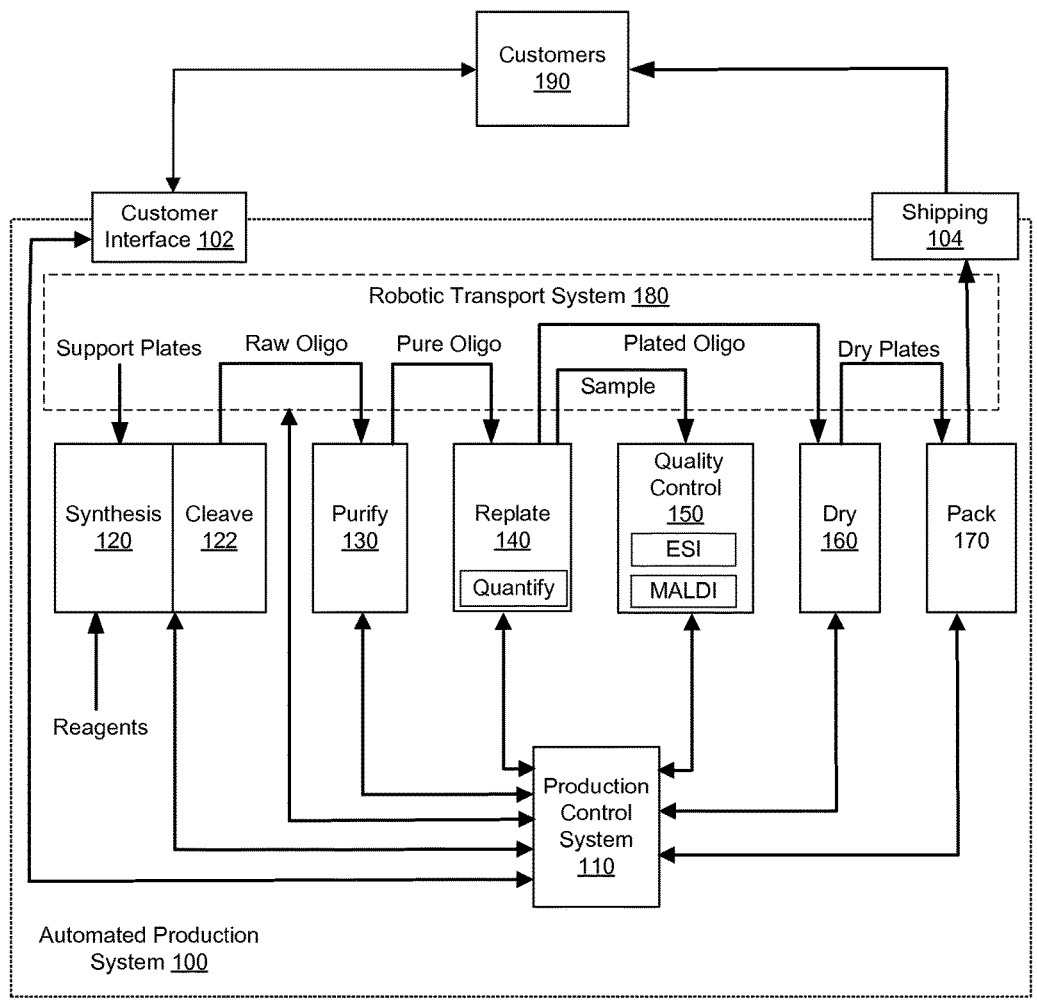
FIG. 1 shows a complete automated biopolymer production system according to an embodiment of the present invention.

FIG. 1 shows an overview of an automated production system 100 according to an embodiment of the present invention. The automated production system 100 may be tailored to provide particular biochemical synthesis products and services. In the example shown in FIG. 1, automated production system 100 is tailored for the manufacture of DNA and RNA oligonucleotide products. The automated production system 100 includes a complete production process including, but not limited to, preparation of reaction vessels, synthesis of oligonucleotides, cleavage of oligonucleotides from the synthesis support, elution of oligonucleotides, oligonucleotide purification, quantization and quality control of oligonucleotides, re-plating of oligonucleotides, dry down of loaded plates, packaging and labeling. The production process requires the coordinated use of a variety of pieces of equipment and the automated transport of material between the equipment.

As described below, the equipment of automated production system 100 is organized as modules which are provided in a two dimensional array. The modules can be added and removed to the array. Connections to the equipment are facilitated by a technician accessible interface on the rear surface of each module while the front surface of each module has an automatic mechanical interface for receiving materials from and returning materials to a robotic transport system for automated transport of materials and products.

In general terms, customers 190 interact with customer interface 102. Customer interface 102 can include a website, Email and/or other communication mechanisms whereby customers can submit information including orders for e.g. DNA/RNA, billing information, and the like and receive information including order status, order results and the like. Orders for DNA/RNA include quantities and sequences of oligonucleotides to be prepared and details of any modified nucleotides/labels. The sequences, quantities and other details are provided to a production control system 110 which oversees the oligonucleotide production process. Preferably the customer interface 102 provides a high degree of automation such that little human intervention/human customer service is required to extract the information from customer communications necessary to drive the automated production process 100. After production, completed product is shipped to customer 190 from shipping interface 104. Additional order information about an order (such as identification of oligonucleotides and quantity/quality data) is communicated to customer 190 via customer interface 102.

Production control system 110 drives automated production system 100. Production control system 110 receives DNA/RNA production information from customer interface 102 and uses the information to determine what DNA/RNA to make and in what quantities. Production control system 110 provides instructions to and monitors each of the subsystems and processes in automated production system 100. Production control system 110 also monitors and tracks materials moving through automated production system 100 such that production control system maintains a record at all times as to which products are present in which vessels from the beginning of synthesis through to packaging and labeling of the final product. This eliminates the need for labelling intermediate products and eliminates the possibility of confusing or mislabeling intermediate products that can occur where technicians are required to move intermediate products between different stations of a production process which is not fully automated.

The automated production system 100 also provides for continuous quality control (as described below) of input reagents and materials and output biopolymer products such as DNA and RNA. The quality control data collected allows production control system 110 to provide for closed loop software control at the system, instrument and channel levels in which the system, instruments, and/or channels may be tuned or calibrated to enhance performance in response to the collected quality control data relevant to the system, instrument or channels. The quality control data can be continuously analyzed by the production control system 110 to determine tuning and/or calibration that is required. Production control system 110 transmits instructions to the instruments of the automated production system 100 to effect any tuning and/or calibration determined to be necessary or desirable according to analysis of the quality control data.

The principal subsystems of automated production system 100 when configured for synthesis of DNA or RNA include synthesis system 120, cleave system 122, purification system 130, re-plate system 140, quality control system 150, drying system 160, packing system 170, and robotic transport system 180. Subsystems may also be integrated such that one or more subsystems are provided in one piece of equipment. As shown in FIG. 1, for example synthesis system 120 and cleave system 122 may be combined in a single piece of equipment. Furthermore, in order to balance the throughput of each subsystem, one or more subsystems may comprises multiple pieces of the same equipment or different equipment operating in parallel. Multiple pieces of equipment may also be used to provide redundancy such that individual modules may be taken offline for servicing without interrupting operation of the automated production system 100.

Figure 4C:
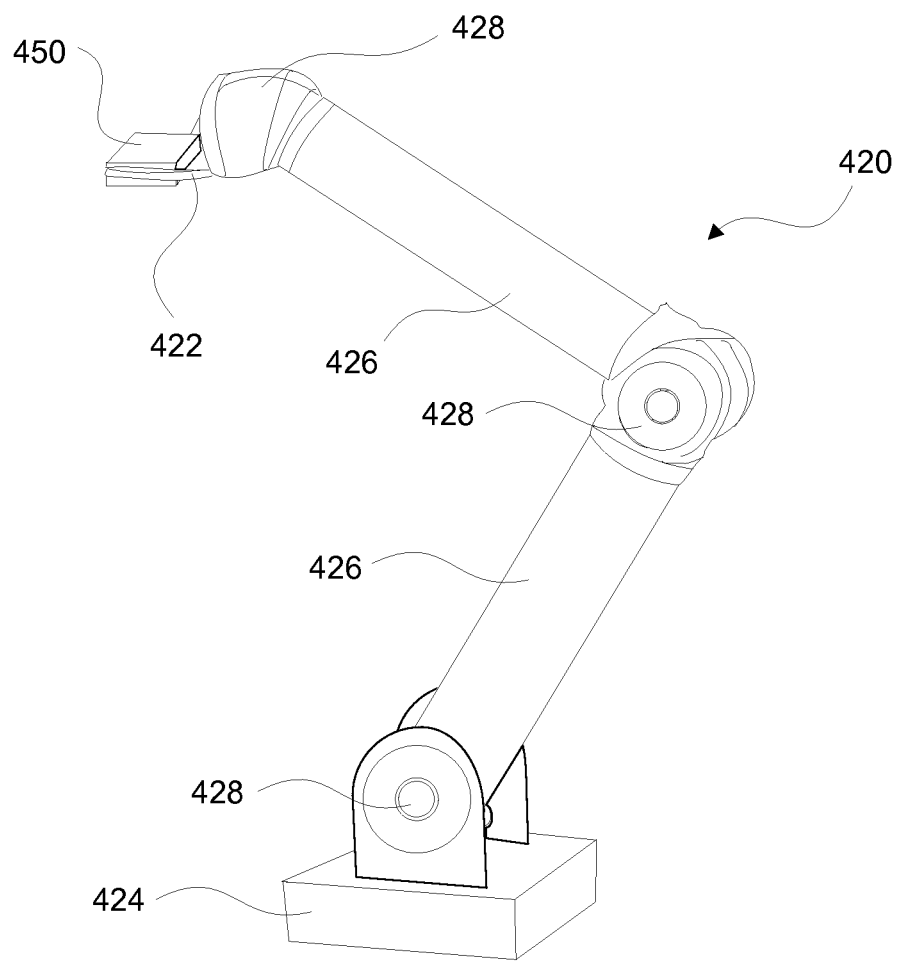

Robotic transport system 180 is responsible for moving material between the various subsystems (See FIGS. 4A-4C). Each subsystem has a mechanical interface responsible for receiving material from robotic transport system 180, moving material within the subsystem, and then delivering processed material back to robotic transport system 180. Robotic transport system 180 moves material between the various subsystems under the control of production control system 110. Production control system 110 schedules work in the various subsystems and keeps track of materials during processing. Accordingly, production control system can instruct robotic transport system 180 to retrieve material from one subsystem and more it to another subsystem. Robotic transport system 180 includes for example a number of robot arms, motion platforms, and grippers which allow it to engage materials and move them between the subsystems. Preferably robotic transport system 180 is modular and has redundant components such that servicing of one arm does not interrupt operation of automated production system 100.

Material is transferred between equipment in a component having an array of vessels. The array of vessels may be for example a microplate also known as a microtitre plate or microwell plate. Standard microplates have been defined having 96, 384, and 1536 separate wells for holding materials. Microplate standards with respect to critical dimensions of the microplates and wells are established by the Society For Laboratory Automation and Screening (SLAS) and American National Standards Institute (ANSI). Commercially available equipment and mechanical equipment interfaces are typically designed to handle microplates which meet the relevant standards—Standards ANSI/SLAS 1-2004 through ANSI/SLAS 4-2004. Although standard microplates are typically used in biochemistry, non-standard microplates, and alternative vessel arrays suitable for containing an organized collection of materials or production products may also be used without departing from the scope of the invention. Thus, although the term microplate will be used, for convenience, throughout this application, the term should be understood to include such alternative vessel arrays.

Typically each subsystem of automated production system 100 has a dedicated control system and communications interface. The control systems and communications interfaces may in some cases be custom designed for interaction with production control system 110. More typically however, where subsystems are made by third party vendors and therefore have particular control systems and interfaces. Production control system 110 therefore includes a library of interface modules designed for interacting with the control systems and interfaces of the subsystems.

Synthesis of oligonucleotides is performed in synthesis system 120. Alternative synthesis systems 120 can be used for production of different biopolymers. Standalone oligonucleotide synthesizers are known in the art. However such synthesizers require operation by skilled technicians. Transport of and material and provision of reagents requires constant technical supervision. In embodiments of the present invention an automated modular oligonucleotide synthesizer is provided. Microplates having an array of wells holding functionalized support medium (typical functionalized controlled pore glass "CPG") are fed into the synthesis system 120 by a robotic transport system 180. Synthesis reagents, power, and gases are fed to the synthesizer from a continuous monitored supply.

Synthesis system 120 comprises a plurality of channels each of which allows for independent synthesis of an oligonucleotide by stepwise extension of the oligonucleotide. In order to control oligonucleotide manufacture the synthesis system provides for stepwise addition of nucleotides to extend the oligonucleotides chains. The system independently controls which nucleotide reagents are added to each vessel of the microplate. For example, synthesis system 120 may comprise having 96, 384, or 1536 independent channels such that a different oligonucleotide can be synthesized in each well of a 96, 384, or 1536 well microplate. Synthesis of particular oligonucleotides and oligonucleotide quantities by synthesis system 120 can be commanded by production control system 110 without human intervention. A plurality of individual synthesizers may be provided operating in parallel as part of synthesis system 120 with production control system 110 responsible for distributing and scheduling the synthesis processes.

Oligonucleotides are synthesized bound to the solid support, e.g. controlled pore glass (CPG), in individual reaction vessels such as the wells of microplates. After completion of synthesis, the reaction products must be cleaved from the CPG. Cleave system 122 provides for cleaving the synthesis products from the CPG. Cleave system 122 can be integrated with synthesis system 120 as shown, or may be a separate piece of equipment if the synthesis system does not have cleaving functionality. Where a separate cleave system 122 is used, the robotic transport system 180 moves the microplate from the synthesizer to the cleavage station automatically. After cleavage, the robotic transport system 180 moves the microplates containing solutions of unpurified synthesis products to the purification system 130.

After cleavage, the synthesis reaction products must be purified in purification system 130. In DNA/RNA synthesis, nucleotides are added sequentially to a molecule. In each extension cycle a small percentage of the molecules will not react. These molecules are capped to prevent further reaction. However, the synthesis reaction products will include molecules of the full intended sequence as well as truncated (shorter) molecules. The purification process separates the desired oligonucleotide products from contaminants (desalting). Purification can also eliminate most of the truncated molecules. Various purification methods may by be implemented by the purification system including Reverse-Phase High Performance Liquid Chromatography (RP-HPLC), Anion-Exchange HPLC, or Gel Filtration, and Polyacrylamide gel electrophoresis (PAGE). The particular purification method is selected based on the properties of the produced oligonucleotides and the desired level of purity. After purification, the robotic transport system 180 moves microplates containing solutions of purified oligonucleotides to a re-plating system 140 for re-plating and quantifying the purified oligonucleotides.

In the re-plating system 140, the purified oligonucleotide is re-plated into shippable microplates for delivery to the customer. Re-plating may include re-plating from one size/type of microplate to e.g. standard 96 well microplates to be provided to the customer. In the re-plating equipment aliquots of the purified oligonucleotides are also removed and passed to one or more mass spectrometry systems for quality control assessment. The re-plating system also includes means for measuring volume and optical absorbance of the oligonucleotide solutions in order to quantify the amount of DNA/RNA present. This information is provided to customer 190 in order that customer 190 may later generate a solution or of a required molarity. The robotic transport system then moves microplates containing solutions of purified oligonucleotide products to a dry down system 160. The robotic transport system also moves duplicate microplates containing the sample aliquots to quality control system 150.

Quality control system 150 includes equipment for assessing the quality of the DNA/RNA products or other biopolymers. Quality control system 150 may include one or more systems for performing mass spectroscopy of the DNA/RNA products. In a preferred embodiment, a combination of electrospray ionization mass spectroscopy (ESI) and matrix assisted laser desorption/ionization (MALDI). The ESI equipment can be used for high throughput screening of all samples whereas MALDI, being low through can be used on a sample population of samples or on samples selected for additional screening based on the ESI results. Quality control system 150 may also be used for analysis of reagents and materials used in the synthesis process. The results of quality control system 150 are provided to production control system 110. The results from quality control system 150 can be used to derive quality information to be provided to customer 190 via customer interface 102.

The results from quality control system 150 can also be used by production control system 110 to monitor and adjust operation of the synthesis and other systems. For example, the quality control results may indicate that one or more channel of synthesis system 120 is no longer synthesizing correctly. Production control system can then adjust operation of synthesis system 120 no longer uses the non-functional channel until after the channel is serviced. Uninterrupted production may however continue on the remaining channels until that service is performed. Additionally, continuous quality control of input reagents and materials and output DNA/RNA products allows for closed loop software control at the system, instrument and channel levels in which the system, instruments, and/or channels may be tuned or calibrated to enhance performance in response to the collected quality control data relevant to the system, instrument or channels. The quality control data can be continuously analyzed by the production control system 110 which can determine tuning and or calibration that is required and transmit instructions to the subsystems of the automated production system 100.

The dry down system 160 comprises an automated vacuum centrifuge system. The vacuum centrifuge automatically controls temperature, spin speed, and vacuum to spin the oligonucleotide to the bottom of the microplate wells and dehydrate the oligonucleotide solutions in the microplate for shipping. After dry down, the robotic transport system 180 then moves the microplates containing dried purified oligonucleotide products to a packaging system 170.

In the packaging system the microplates are sealed by applying an impermeable film over the wells. The microplates are then labeled and packaged for shipping to the customer 190. The package, labeled product is removed from the packaging station by the robotic transport system and can then be distributed from shipping 104 directly to the customer 190.

In addition to the shipped product the customer 190 is also provide with quantization data indicating the amount of oligonucleotide provided and information identifying the sequence of oligonucleotide in each well of the shipping plate. Additionally quality control information derived from mass spectrometry of the sample aliquot of the oligonucleotide is also provided to the customer. The product quantity, sequence, and quality information can be provided to customer 190 automatically via customer interface 102.

Although the automated production system described above is directed to the production of DNA and RNA, the modular system may be readily adapted by substitution or addition of various components to the production and/or analysis of other biopolymers, synthetic polymers, and other molecules where it is necessary or desirable to produce and/or screen a large number of different compounds in an automated and efficient manner. For example, a hybridization or screening process may be added using the existing ESI and/or MALDI equipment in combination with a liquid handling step to add a target molecule to the synthesized DNA/RNA and or Aptamers. Alternatively additional equipment may be added for adding reagents to microplates of synthesized products and then screening/reading the microplates to identify desirable products. In a recursive process, where desirable products are discovered, variations of the desirable products may then be synthesized and assessed to identify more desirable products having better properties/specificity to 'evolve" synthesis products having desirable properties over several generations. The "evolution process" can be performed in an automated fashion under the control of production control system 110. In alternative embodiments, synthesis system 120 suitable for synthesizing DNA and/or RNA may be substituted with a synthesis system suitable for producing peptides, polymers or other molecules.

In a particular embodiment, the automated system can be used for experimentation in addition to or instead of biopolymer production. Modules in the array can include fluorescent microscopes or scanners, PCR thermocyclers, gel electrophoresis units, shakers and incubators for growing cells, and any other scientific devices and instrumentation configured for integration into the array and control by the production control system. Analogous to how customers place order for production of custom biopolymers, they would place orders for experimental processes—and such orders could range from simple single step experiments like measuring the kinetics of a reaction to complex iterative series of experiments with conditional logic between steps. An iterative series of experiments could comprise, for example: 1) synthesizing a DNA vector with a number of random variations; 2) transfecting populations of cells; 3) measuring expression of the vectors; 4) analyzing a property of interest of the transfected cells; 5) selecting the best performing vector; 6) generating new DNA vector sequences based on the best performing vector; 7) repeating steps 2-6 until certain performance criteria are met; and 8) exiting the cycle when certain performance criteria are met delivering one or more sequence of DNA vectors meeting the performance criteria (and/or synthesized DNA of the identified one or more sequences).

Modular Equipment

As described above, the production process requires the coordinated use of a variety of pieces of equipment and the automated transport of material between the equipment. As described below, the equipment is organized as modules which are provided in an array. In a preferred embodiment the modules are arranged in one or more linear array, however other array topographies may also be used. Modules can be stacked vertically as well as adjacent to each other for a two dimensional array. The modules can be designed to mount to a rack or stack one upon the other. For higher density, parallelism and redundancy, modules can be configured with connections on top, and multiple arrays can be arranged back to back with special modules dedicated to passing materials between the arrays. In this configuration, processes can be routed between arrays in the event of module failure and production can continue uninterrupted without human intervention.

The modules are designed such that they can be easily added to and removed from the array without interrupting the production process in the remaining modules. Connections to the equipment are facilitated by a technician accessible interface accessible from the rear surface of each module while the front surface of each module has an automatic mechanical interface for receiving materials from and returning materials to a robotic transport system for automated transport of materials and products. The array is designed such that the robotic transport system has exclusive access to the front side mechanical interfaces of the modules in a human-free zone. Technician access to the modules for adding, removing, connecting and servicing the modules is made from a separate zone (for example the rear side of a linear array or the outside of a circular array.

Figure 2A:
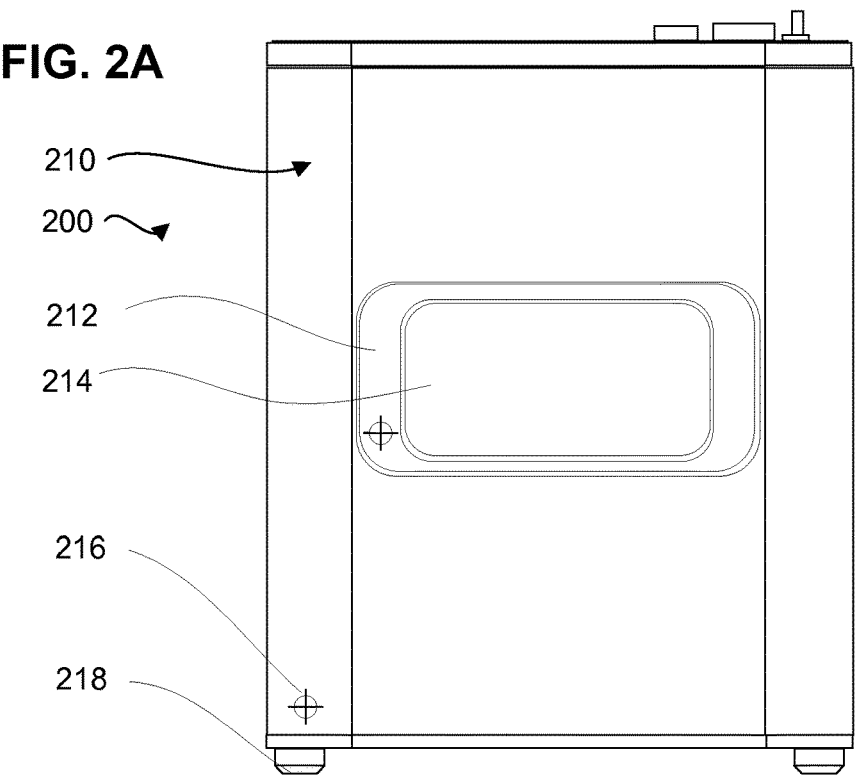
FIGS. 2A and 2B show an example of an equipment module for use in the automated biopolymer production system of FIG. 1 according to an embodiment of the present invention.
Figure 2B:
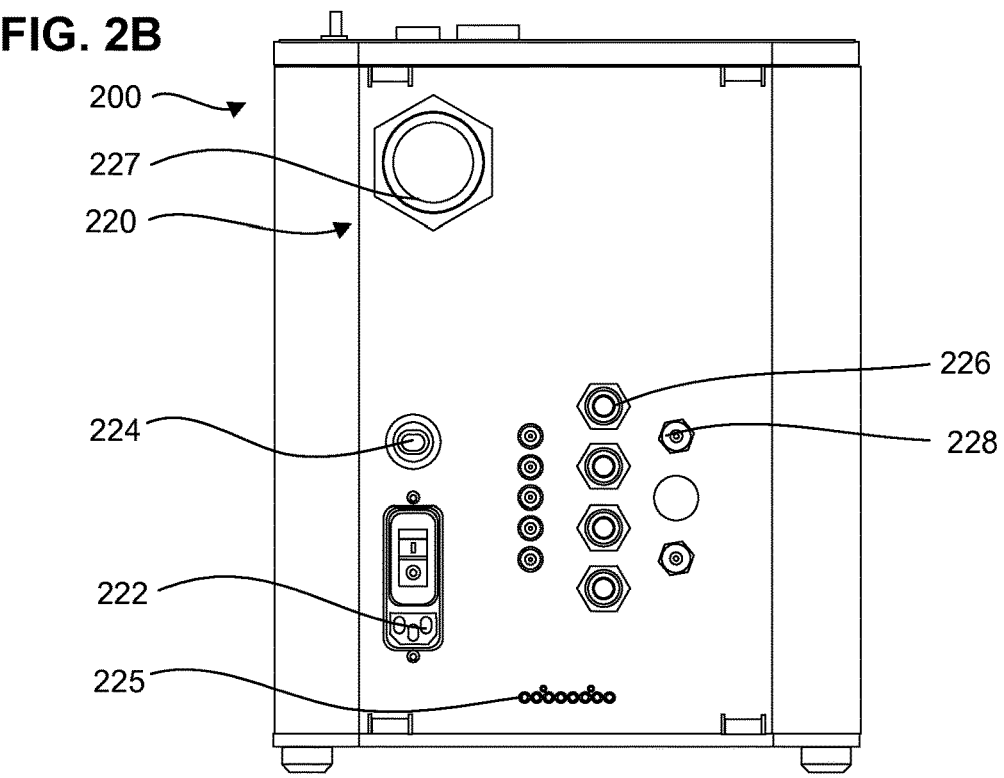

FIGS. 2A-2B illustrate examples of modular equipment according to an embodiment of the present invention. The various equipment of the Oligonucleotide synthesis system is provided in modules. Each module provides a rack mountable envelope that encapsulates a piece of equipment used in the oligonucleotide synthesis system.

FIG. 2A shows the front side of an example module 200. As shown in FIG. 2A, the front side 210 of module 200 includes a mechanical interface 212. Mechanical interface 212 is typically a motorized device having a door 214 which extends from and retracts into module 200 in order to receive microplates from the robotic transport system for processing and then redelivering processed microplates to the robotic transport system. Standard motion control systems are available for receiving material via door 214.

The front side 210 of module 200 may also comprise one or more registration points 216 which allows for identification and registration of the robotic transport system with the door 214 of mechanical interface 212. Registration points 216 can be mechanically recognized by the robotic transport system using e.g. a training process. Alternative a robot vision system may identify and locate the registration points. Module 200, may also be provided with mounting features 218 for connecting and securing the module 200 to a rack (not shown). Mounting features 218 may also serve for identification and registration of the robotic transport system with the door 214 of mechanical interface 212 in addition to or as an alternative to registration points 216.

FIG. 2B shows the rear side 220 of an example module 200. As shown in FIG. 2A, the rear side 220 of module 200 includes interface features which allow module 200 be connected by a technician to power, network, gases and fluids. All of the necessary connections for module 200 are provided on the rear side 220 of module 200 such that they can be accessed by a technician. For example, rear side 220 of module 200 includes power connection 222, network connection 224, module purge connection 227, and a plurality of quick connections 226, 228 for gases, reagents, vacuum, water etc. Rear side 220 may also comprise an array of warning and or status lights 225.

FIGS. 2A and 2B show an example of a module 200. Automated production system 100 includes a collection of different modules performing different functions. Each module may be custom designed for use in the automated production system 100 or may comprises commercially available equipment to which has been added a module envelope which adapts the equipment for use in automated production system 100 by providing connections on the rear side, an appropriate robotic transport system interface on the front side and features for mounting the equipment in the modular array.

Automated production system 100 includes, for example: a custom DNA/RNA synthesizer which uses amidite reagents to synthesize DNA/RNA in accordance with sequences and quantities specified in customer orders; and a custom vacuum centrifuge which provides controlled heat and vacuum at high g forces in order to dry down plates of purified DNA/RNA. Automated production system 100 also includes modularized commercially available equipment, including, for example: Tecan Freedom EVO 150; MALDI Bruker—Autoflex Speed; Plate Labeler—BioSero Gecko; Plate Sealer—BioSero Wasp; UV-VIS—BMG Labtech Nano; and Plate Washer—Matrical Squirt. Additional or different equipment may be integrated into the array, including but not limited to synthesis modules for biopolymers other than DNA and RNA, fluorescent microscopes or scanners, PCR thermocyclers, gel electrophoresis units, shakers and incubators for growing cells, and any other scientific devices and instrumentation configured for control by the production control system.

Modular Equipment Array

Figure 3A:
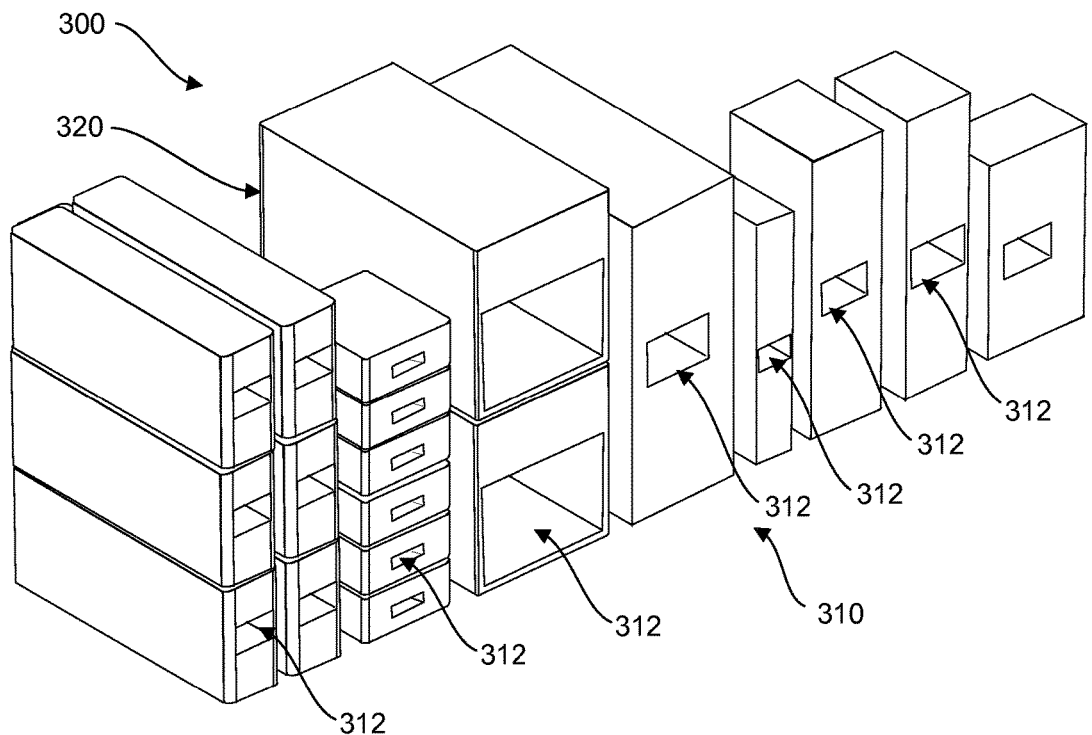
FIGS. 3A and 3B show aspects of a modular equipment array for use in the automated biopolymer production system of FIG. 1 according to an embodiment of the present invention.
Figure 3B:
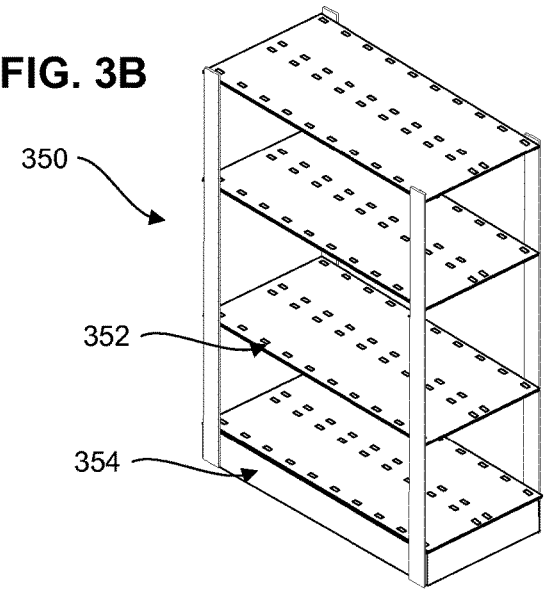

In a preferred embodiment the equipment making up automated production system 100 including synthesis system 120, cleave system 122, purification system 130, replate system 140, quality control system 150, drying system 160, packing system 170 are arranged as a modular equipment array 300 in a rack system 350. Modules can be added, removed from system for maintenance repair without impairing functioning of system or interrupting production. FIGS. 3A and 3B illustrate components and an example layout of a modular equipment array 300 and rack system 350 according to an embodiment of the present invention.

Modules can be stacked vertically as well as adjacent to each other for a two dimensional array. The modules can be designed to mount to a rack or stack one upon the other. For higher density, parallelism and redundancy, modules can be configured with connections on top, and multiple arrays can be arranged back to back with special modules dedicated to passing materials between the arrays. In this configuration, processes can be routed between arrays in the event of module failure and production can continue uninterrupted without human intervention.

FIG. 3A shows a layout for a modular equipment array 300. As shown in FIG. 3A, the modules in vertical groups with the groups arranged in a linear array. Depending on the throughput of each module type there may be only a single module of a particular module type or a plurality of modules of a particular module type operating in parallel. Work is divided between multiple units/scheduled by production control system. The front side 310 of the modular equipment array 300 presents the mechanical interfaces 312 of each module for receiving materials from the robotic transport system and returning materials to the robotic transport system. Preferably the front side of the array requires no technician access. The rear side 320 of modular equipment array 300 presents interfaces which allow a technician to make power, network, gas, and reagent connections (See FIG. 2B). Preferably all consumables are plumbed in from monitored sources which provide a continuous/uninterrupted supply of consumables.

Where multiple units of a particular module type are provided, the modules are designed to be stackable in a rack 350. Preferably rack 350 includes features 352 for securing and registering the presence of a module such that the production control system is notified which modules are present and online at any point in time. Accordingly the production control system is aware of which systems are present, and can adjust for equipment removed/unavailable by routing materials to operating modules using the robotic transport system. Scheduling software can be instructed to take a module offline or put a module online on the fly. The robotic transport system will then no longer service the module and it can be pulled from the rack without having to interrupt the production process. Preferably each rack 350, includes a computer system, cooling, QC system, tracking, system, power supply, and UPS 354 which can be shared by all of the equipment in the rack 350.

To facilitate connections of utilities and reagents to modules in the modular equipment array 300 a supply system is provided to connect the modules to sources of gasses, liquids, power, and vacuum. FIGS. 3C-3E illustrate an embodiment of a supply system designed to facilitate connection of required utilities to modules in modular equipment array 300. FIG. 3C shows the rear side of modular equipment array 300. Each of the modules is provided with a standard format utility interface 360 (see FIG. 3D for detail). Utilities are provided from a series of supply lines 362 which connect to sources of gasses, liquids, power, and vacuum. Manifolds 364 are connected to the supply lines 362 at intervals. Each of the manifolds 364 is also provided with a standard format utility interface (see FIG. 3D for detail).

The use of a standard format utility interface 360 and multi-lumen connector 366 facilitates connection and disconnection of modules allowing for their removal and replacement in the modular equipment array 300. Additionally the standard format utility interface avoids the possibility of user error in connecting the supply lines to the modules. Where separate lines are connected it is possible for a technician to connect the supply lines to the wrong ports of the modules thereby causing at least incorrect operation of the modules but also possibly damaging the modules. The supply lines may be quickly connected to the modules of the equipment array by attaching a multi-lumen connector 366 (see FIG. 3E) to the standard format utility interface 360 of the manifold 364 and the standard format utility interface 360 of the module. The supply lines may also be quickly disconnected from the modules by removing the multi-lumen connector 366.

FIG. 3D shows an example of the standard format utility interface 360. As shown in FIG. 3D, standard format utility interface 360 includes a plurality of ports 370—6 ports are shown in FIG. 3D but a greater or lesser number of ports may be included depending upon the needs of the modules in modular equipment array 300. The ports may be of various types depending upon the type of utility, for example the ports may be quick connect ports for gasses and liquids, and electrical receivers for power and data connections. The ports are arranged in standard order and placement for all modules. Where a module does not require a particular utility, that port is left blank, capped, or plugged however, the arrangement of the other ports is unchanged. Standard format utility interface 360 includes a plurality of fasteners 372 for connecting to the multi-lumen connector 366. Standard format utility interface 360 also includes a registration feature 374, such as a pin which ensures that the multi-lumen connector 366 can only be connected to the standard format utility interface 360 in the correct orientation.

FIG. 3E shows an example of multi-lumen connector 366. Multi-lumen connector includes couplings 380 at each end of a multi-lumen flexible coupling 366. Multi-lumen coupling may include lumens for gasses, liquids, and vacuum, as well as electrical wires for data and power. Couplings 380 are designed to mates with the standard format utility interface 360 in a manner which aligns the ports 370 of couplings 380 with the ports 370 of the standard format utility interface 360. The ports may be of various types depending upon the type of utility, for example the ports may be quick connect ports for gasses and liquids, and electrical receivers for power and data connections and are each designed to mate with the corresponding ports of the standard format utility interface 360. Couplings 380 includes a plurality of fasteners 382 for connecting to the fasteners 372 of the standard format utility interface 360. Couplings 380 also include a registration feature 374, such as a hole which ensures that the multi-lumen connector 366 can only be connected to the standard format utility interface 360 in the correct orientation.

Robotic Transport System

FIGS. 4A-4C show an embodiment 400 of robotic transport system 180 of FIG. 1, for moving materials between subsystems of the automated production system 100 of FIG. 1 according to an embodiment of the present invention. FIG. 4A shows a robotic transport system in combination with a single modular equipment array 300. FIG. 4B shows a robotic transport system in combination with a two modular equipment arrays 300. FIG. 4C shows a robotic arm component of the robotic transport system.

Referring to FIG. 4A which shows a robotic transport system 400 in combination with a single modular equipment array 300. The robotic transport system 400 moves materials between machine operable interfaces of the various pieces of equipment in the modular equipment array under the control of the production control system. Transport of material on robotic transport system side performed without human intervention. The robotic transport system includes a gantry 410 and two or more robot arms 420.

The gantry 410 provides for independent linear movement of the robot arms 420 along a track or tracks 412 such that the robot arms may be aligned with any equipment of the modular equipment array 300. The robot arms 420 provide multiple degrees of freedom such that they can interact with the mechanical interface of any equipment in the modular equipment array 300 when appropriately position on gantry 410. Two or more robot arms 420 are provided to allow multiple simultaneous actions and redundancy in case of failure. The arms are also modular such that they can be removed, repaired and replaced without interruption operation of the automated production system.

FIG. 4A shows the working envelope 430 of the robotic transport system. As shown in FIG. 4A, the working envelope 430 encompasses the mechanical interfaces of all the equipment in the modular equipment array 300. Robotic transport system 400 has sufficient range of motion to access all material interfaces of modular equipment array 300. The working envelope 430 is typically preserved as a human-free zone, either by fences, barriers or warnings, such that the robot transport system operates without obstruction and contamination in the zone where materials are transported is minimized. In some cases, the working envelope is sealed or partially sealed from the remaining lab space to form a separate clean room to reduce contamination and/or maintain a controlled environment for the equipment and reactions—e.g. by controlling or limiting the oxygen and moisture in the working envelope. As previously described, technician access is limited to the rear side 432 of modular equipment array 300 where all the interfaces are provided for connecting and servicing the equipment.

FIG. 4B shows an alternative arrangement where robotic transport system 400 operates in conjunction with two modular equipment arrays 300. The robotic transport system includes a gantry 410 and two or more robot arms 420. Robotic transport system 400 has sufficient range of motion to access all material interfaces of both modular equipment arrays 300. The working envelope 430 is typically preserved as a human-free zone, either by fences, barriers or warnings, such that the robot transport system operates without obstruction and contamination in the zone where materials are transported is minimized. In some cases, the working envelope 430 is sealed or partially sealed from the remaining lab space to form a separate clean room to reduce contamination. As previously described, technician access is limited to the rear side 432 of each modular equipment array 300 where all the interfaces are provided for connecting and servicing the equipment.

Robotic transport system 400 may automatically detects/register the mechanical interfaces of equipment modules present in modular equipment array 300. This registration may be achieved for example by notification of the presence of a piece of equipment in a rack in combinations with a stored record of the position of the mechanical interface in the piece of equipment. When a new rack is set up, the position and orientation of a local rack coordinate system is defines relative to the robotic transport system by having the tip of the robot arm probe orientation points on the rack. The position of all modules and their mechanical interfaces can then be precisely defined relative to the coordinate system. The production control system has internal models of the mechanical interfaces of the equipment such that after defining the coordinate system of the rack the production control system can find each mechanical interface with the robotic transport system. Alternatively, the robotic transport system may be trained as to mechanical interface location using mechanical and/or visual registration features provided on the equipment.

FIG. 4C shows an enlarged view of a robot arm 420. As shown in FIG. 4C, robot arm 420 includes a gripper mechanism 422 designed to engage and release a microplate 450 in order to move a microplate 450 between the mechanical interfaces of different pieces of equipment. Robot arm 420 includes a base 424 adapted to be mounted to the gantry 410. Between bases 424 and gripper mechanism are a plurality of linkages 426 and joints 428 which allow the robot arm to move the gripper mechanism 422 relative to the base 424 with sufficient degrees of freedom and range of motion in order to access microplates at the mechanical interfaces of different pieces of equipment in the modular equipment array. Preferably, robot arm 420 is a commercially available 6 degree of freedom robot arm having a sufficiently large range of motion to reach all mechanical interfaces within the desired working envelope 430 when combined with the linear movement provided by gantry 410.

As shown in FIG. 1, robotic transport system 180 of which robotic transport system 400 is an example, operates under control of production control system 110. Production control system 110 schedules operations of the equipment in the modular equipment array 300 and operates the robotic transport system 180 to move materials between different pieces of equipment. Production control system 110 is notified when equipment is added to or removed from the modular equipment array 300 and can adjust scheduling of equipment operation and movement by robotic transport system 180 to adjust for missing/unavailable equipment.

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. Although the modular system described is directed to the production of DNA and RNA, the modular system may be readily adapted by substitution or addition of various components to the production and/or analysis of a wide range of biopolymers where it is necessary or desirable to produce and/or analyze a large number of different compounds in an automated and efficient manner. It is intended that the scope of the invention be defined by the claims and their equivalents.

What is claimed is:

1. An automated production system comprising:
   a production control system which controls production in an automated oligonucleotide production process;
   a plurality of equipment modules for processing materials under control of the production control system, wherein each equipment module comprises on a front side a mechanical interface for receiving materials and transmitting processed materials, and, on a rear side, an interface for connecting power, network, and any required reagents;
   wherein the plurality of equipment modules includes:
   an oligonucleotide synthesis system and one or more of,
   an oligonucleotide purification system,
   an oligonucleotide quantization system,
   an oligonucleotide quality control system, and
   a packaging/labeling system;
   a linear array in which the plurality of equipment modules is secured such that the mechanical interfaces are accessible from a front side of the linear array and all the interfaces are accessible from a rear side of the linear array; and
   a robotic transport system positioned adjacent to the front side of the linear array, wherein the robotic transport system includes a plurality of robot arms adapted to move processed materials between the mechanical interfaces of the plurality of equipment modules under the control of the production control system;
   whereby oligonucleotides can be automatically synthesized and processed by the plurality of equipment modules under control of the production control system.

2. The automated production system of claim 1, wherein;
   the robotic transport system and the front side of the linear array is secured as a human-free zone; and
   technician access to the linear array is limited, during operation of the automated production system, to the rear side of the linear array.

3. The automated production system of claim 1, wherein the plurality of equipment modules are hot-swappable under control of the production control system such that individual equipment modules may be deactivated and removed from the linear array for servicing without interruption to the automated production process.

4. The automated production system of claim 1, wherein the robotic transport system comprises a gantry system for moving the robot arms in a direction parallel to the linear array of equipment modules such that the robot arms can access the mechanical interfaces of the plurality of equipment modules.

5. The automated production system of claim 1, wherein the oligonucleotide production process is one of a DNA synthesis and an RNA synthesis process.

6. The automated production system of claim 1, further comprising:
a customer interface for receiving production orders from customers and providing production orders to the production control system whereby the production control system can control production of oligonucleotides in the automated oligonucleotide production process in response to said production orders received from customers via the customer interface.

7. An automated production system comprising:
a production control system which controls an automated oligonucleotide production process;
a plurality of equipment modules which process materials under control of the production control system, wherein each equipment module comprises a mechanical interface for receiving materials and transmitting processed materials, a system interface for connecting power, network, and any required fluids, and reagents;
wherein the plurality of equipment modules includes:
an oligonucleotide synthesis system and one or more of,
an oligonucleotide purification system,
an oligonucleotide quantization system,
an oligonucleotide quality control system, and
a packaging/labeling system;
an array in which the plurality of equipment modules is arranged and secured such that the mechanical interfaces are accessible from a front side of the array; and
a robotic transport system positioned adjacent to the front side of the array, wherein the robotic transport system includes one or more robot arms adapted to move materials and processed materials between the mechanical interfaces of the plurality of equipment modules under the control of the production control system;
whereby oligonucleotides can be automatically synthesized and processed by the plurality of equipment modules under control of the production control system.

8. The automated production system of claim 7, wherein the robotic transport system and the front side of the array is secured as a human-free zone.

9. The automated production system of claim 7, wherein the plurality of equipment modules are hot-swappable under control of the production control system such that individual equipment modules may be deactivated and removed from the array for servicing without interruption to the automated production process.

10. The automated production system of claim 7, wherein the oligonucleotide production process is one of a DNA synthesis process and an RNA synthesis process.

11. The automated production system of claim 7, further comprising:
a customer interface connected to the production control system wherein the customer interface receives oligonucleotide production orders including sequence information from customers and provides oligonucleotide production information to the production control system whereby oligonucleotides having sequences specified by the oligonucleotide sequence information in the oligonucleotide production orders can be automatically synthesized and processed by the plurality of equipment modules under control of the production control system.

12. The automated production system of claim 7, wherein the plurality of equipment modules includes an oligonucleotide synthesis system, an oligonucleotide purification system, an oligonucleotide quality control system, an oligonucleotide re-plating system, and a centrifuge system for oligonucleotide dry down, whereby oligonucleotides can be automatically synthesized and processed by the plurality of equipment modules under control of the production control system.

13. The automated production system of claim 12, wherein the automated production system is configured for production of DNA oligonucleotides.

14. The automated production system of claim 12, wherein the automated production system is configured for production of RNA oligonucleotides.

15. An automated production system comprising:
a production control system which controls production in an automated oligonucleotide production process;
a plurality of equipment modules which process materials under control of the production control system wherein the plurality of equipment modules includes:
an oligonucleotide synthesis system and one or more of,
an oligonucleotide cleavage system
an oligonucleotide purification system,
an oligonucleotide quantization system,
an oligonucleotide quality control system,
an oligonucleotide re-plating system,
a centrifuge system for oligonucleotide dry down, and
a packaging/labeling system;
wherein each equipment module comprises a mechanical interface for receiving materials and transmitting processed materials, and, a system interface which provides power, communication with the production control system, and any required reagents;
a robotic transport system including one or more robotic arms adapted to move processed materials between the mechanical interfaces of the plurality of equipment modules under the control of the production control system; and
an array in which the plurality of equipment modules is arranged adjacent to the robotic transport system such that the mechanical interfaces are accessible by the one or more robotic arms;
whereby oligonucleotides can be automatically synthesized and processed by the plurality of equipment modules under control of the production control system.

16. The automated production system of claim 15, wherein the robotic transport system is secured as a human-free zone.

17. The automated production system of claim 15, wherein the plurality of equipment modules are hot-swappable under control of the production control system such that individual equipment modules may be deactivated and removed from the array for servicing without interruption to the automated production process.

18. The automated production system of claim 15, further comprising:
a customer interface connected to the production control system wherein the customer interface receives oligonucleotide production orders including oligonucleotide sequence information from customers and provides oligonucleotide production information to the production control system whereby oligonucleotide having sequences specified by the oligonucleotide sequence information in the oligonucleotide production orders can be automatically synthesized and processed by the plurality of equipment modules under control of the production control system.

19. The automated production system of claim 16, wherein the oligonucleotide production process is a DNA oligonucleotide synthesis process and the plurality of equipment modules includes a DNA oligonucleotide synthesis system, a DNA oligonucleotide purification system, and one or more of a DNA oligonucleotide cleavage system, a DNA oligonucleotide quality control system, a DNA oligonucleotide re-plating system, a centrifuge system for DNA oligonucleotide dry down, and a packaging and labeling system.

20. The automated production system of claim 16, wherein the oligonucleotide production process is an RNA oligonucleotide synthesis process and the plurality of equipment modules includes an RNA oligonucleotide synthesis system, an RNA oligonucleotide purification system, and one or more of an RNA oligonucleotide cleavage system, an RNA oligonucleotide quality control system, an RNA oligonucleotide re-plating system, a centrifuge system for RNA oligonucleotide dry down, and a packaging and labeling system.

* * * * *